United States Patent [19]

Karras

[11] 4,250,354
[45] Feb. 10, 1981

[54] TELEPHONE DAY COUNT TRAFFIC OBSERVING AND DATA ACCUMULATING EQUIPMENT

[76] Inventor: Ernest C. Karras, 18 W. 772 Ave. Chateaux N., Oak Brook, Ill. 60521

[21] Appl. No.: 737,210

[22] Filed: Nov. 1, 1976

[51] Int. Cl.³ .......................................... H04M 15/22
[52] U.S. Cl. ................................. 179/8 A; 179/7 R; 179/175.2 C
[58] Field of Search ............... 179/7 R, 7.1 R, 7 MM, 179/7.1 TP, 8 R, 8 A, 9, 2 DP, 2 A, 2 AM, 175.2 R, 175.2 C; 235/92 TE

[56] References Cited

U.S. PATENT DOCUMENTS

| | | | |
|---|---|---|---|
| 3,288,934 | 11/1966 | Haydon | 179/8 A |
| 3,324,241 | 6/1967 | Bachelet | 179/8 A |
| 3,351,910 | 11/1967 | Miller et al. | 179/7 R |
| 3,868,480 | 2/1975 | Murgio et al. | 179/8 A |
| 3,916,123 | 10/1975 | Werner et al. | 179/175.2 C |
| 4,022,978 | 5/1977 | Connell et al. | 179/8 A |

OTHER PUBLICATIONS

*Telephony,* vol. 184, No. 23, "A Computerized System for Improved Traffic Data Collection", Dinger, pp. 37–40.

Primary Examiner—Gerald L. Brigance
Attorney, Agent, or Firm—Laff, Whitesel & Rockman

[57] ABSTRACT

Meters accumulate peg count signals occurring in an observed telephone system. These signals are subtotaled on a daily basis, and totaled on a weekly or similar basis, for the seven-day period (for example) immediately following an initial start or reset. The outputs of these meters are connected to a pollable device which may be seized via the telephone switching system being observed, whenever central testing or similar equipment dials the directory number of such a pollable device. This way, the peg count information may be automatically processed by a central computer, without necessarily requiring the intervention of a human operator.

10 Claims, 4 Drawing Figures

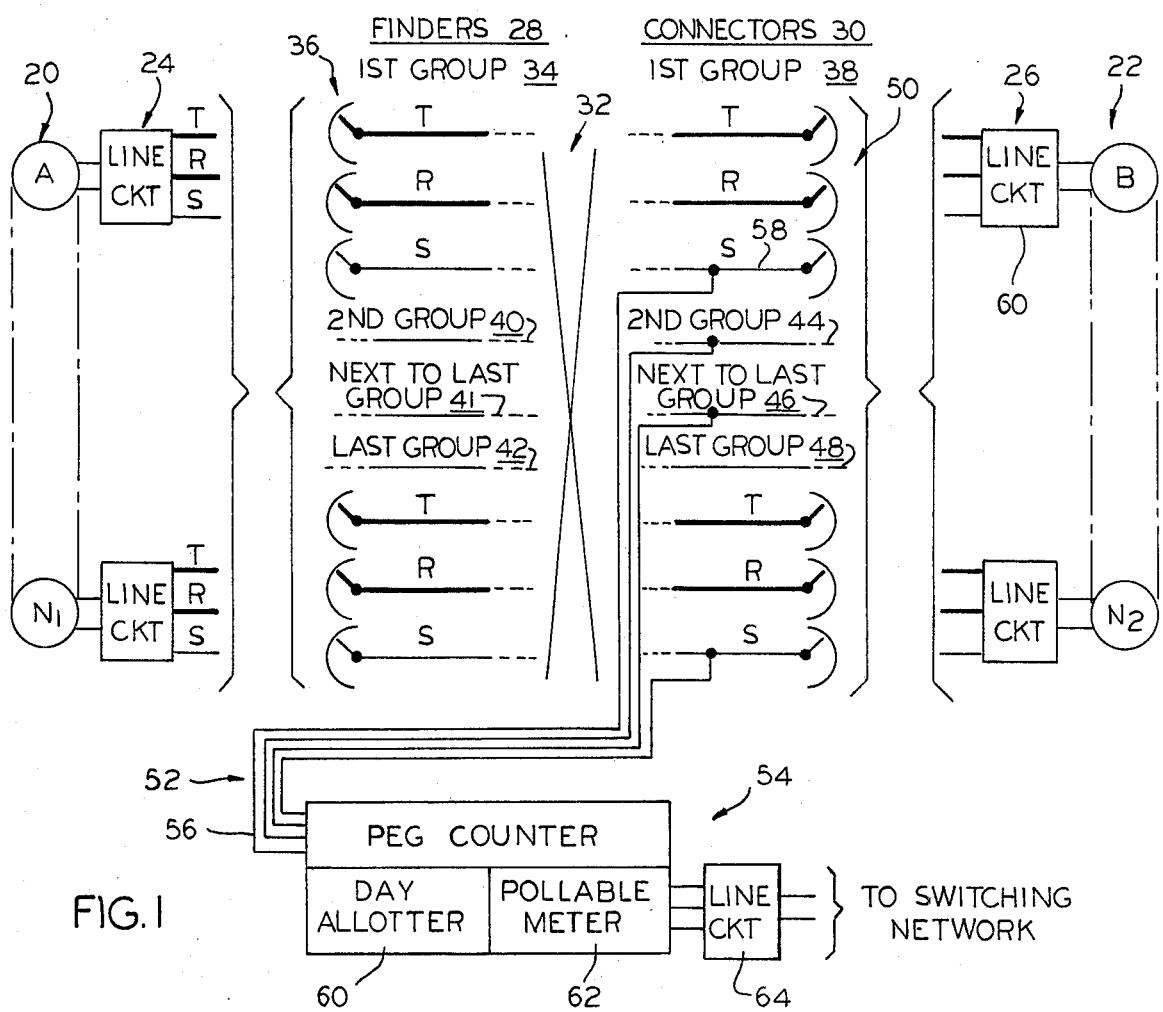
FIG.1
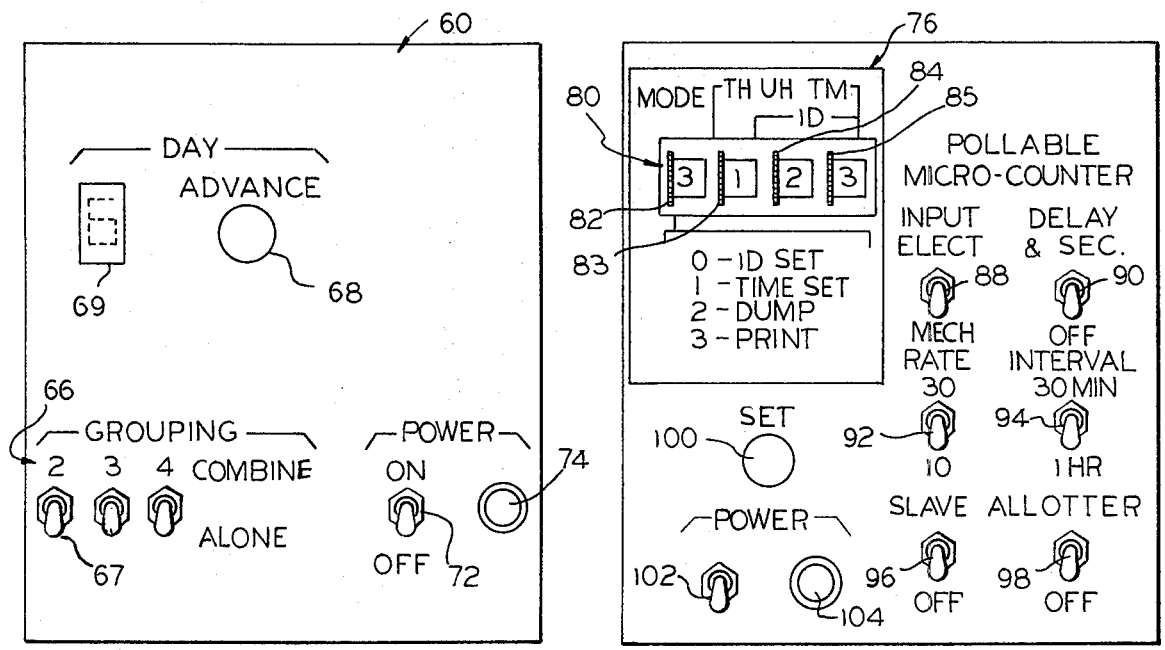
FIG.2
FIG.3

TELEPHONE DAY COUNT TRAFFIC OBSERVING AND DATA ACCUMULATING EQUIPMENT

This invention relates to day count traffic observation and analysis equipment, especially for use in telephone switching systems, and more particularly to remotely pollable equipment for allotting traffic data on both a day count and weekly total.

In telephone switching systems, it is common practice to provide peg count apparatus for keeping a record of equipment usage. A peg count is merely a tally kept on a meter which is operated once, each time that a piece of equipment is seized and put into operation. Thus, the tally indicates the total number of times that the equipment being observed is used. This tally is important because it informs the company owning the equipment whether it has provided too much, too little or just the right amount of equipment.

A meaningful piece of traffic information also relates the peg counts to the time of usage. For example, one of the more useful reporting schemes keeps a peg count tally on a daily basis. Thus, a report might be printed each week to show that switching traffic in the observed equipment reaches a peak on, say, Thursday of each week and a low point on Sunday of each week. If this is the case, then obviously that observed equipment should be provided in a quantity adequate to meet the peak Thursday demand. (The weekly report might show both the total usage for the entire week and an allocation of such total on a day-by-day basis, in which case the reporting equipment is called a "day allotter").

On the other hand, it is also possible that it would be very wasteful to provide enough of such observed equipment for Thursday's needs (in this example), if no other day in the week even approaches the Thursday demands. If this is the case, it might be preferable to split up and redistribute the group of observed equipment with other groups that have peak demands on other days in the week. For example, possibly one-half of this observed group of equipment with peak demand on Thursday could be combined with one-half of another group of similar equipment having peak demands on Sunday. Then, a superior grade of service would be given to all subscribers. Of course, this is just a hypothetical example.

Heretofore, a common practice has been to have a person jot down the readings on all peg count meters in a central office once every week or every day, depending upon the accuracy sought. This is a labor intensive procedure and, therefore, very expensive and subject to human error. Moreover, if a normal tally is kept by hand, it is not directly usable in a computerized analysis, without further processing, which introduces both costs and chances for error.

Accordingly, an object of this invention is to provide new and improved traffic observation and analysis equipment for use in a telephone switching office. Here, an object is to provide means for keeping daily tallies of observed equipment usage in telephone switching offices. In this connection, an object is to provide general purpose peg count meters which may be connected to any specific equipment for an analysis of traffic through that equipment.

Another object of this invention is to provide means for keeping peg count tallies and for automatically reporting such tallies to remote locations. Here, an object is to report such tallies on either or both a daily and a cumulative total basis. In particular, an object is to enable a direct transfer of data from the traffic observing equipment into the memory banks of a computer.

Another object of the invention is to provide a day count allotter which may report traffic totals on any selected time basis, up to a preselected maximum, either on a programmed read out schedule or on demand from an interrogating machine.

In keeping with an aspect of the invention, these and other objects are accomplished by electronically driven meters which may be connected to any observed pieces of equipment, to accumulate peg count signals on a daily basis, for a seven-day period (in this particular example) following an initial start or reset of the meters. The outputs of these meters are connected to a pollable device which may be seized via an associated telephone switching system. Whenever suitable central equipment dials the directory number of such a pollable device, the accumulated tally counts are read out, either or both on a daily allotment or on a cumulative total basis. This way, the peg count information may be automatically processed by a central computer or similar device, without necessarily requiring the intervention of a human operator.

The nature of a preferred embodiment will be understood from a study of the attached drawings, wherein:

FIG. 1 is a simplified drawing of a telephone switching system using the invention, by way of example, to observe traffic through groups of connecting or terminating switches;

FIG. 2 is an elevation view of a day count allotter;

FIG. 3 is an elevation view of a pollable reporting terminal; and

Figure 4:
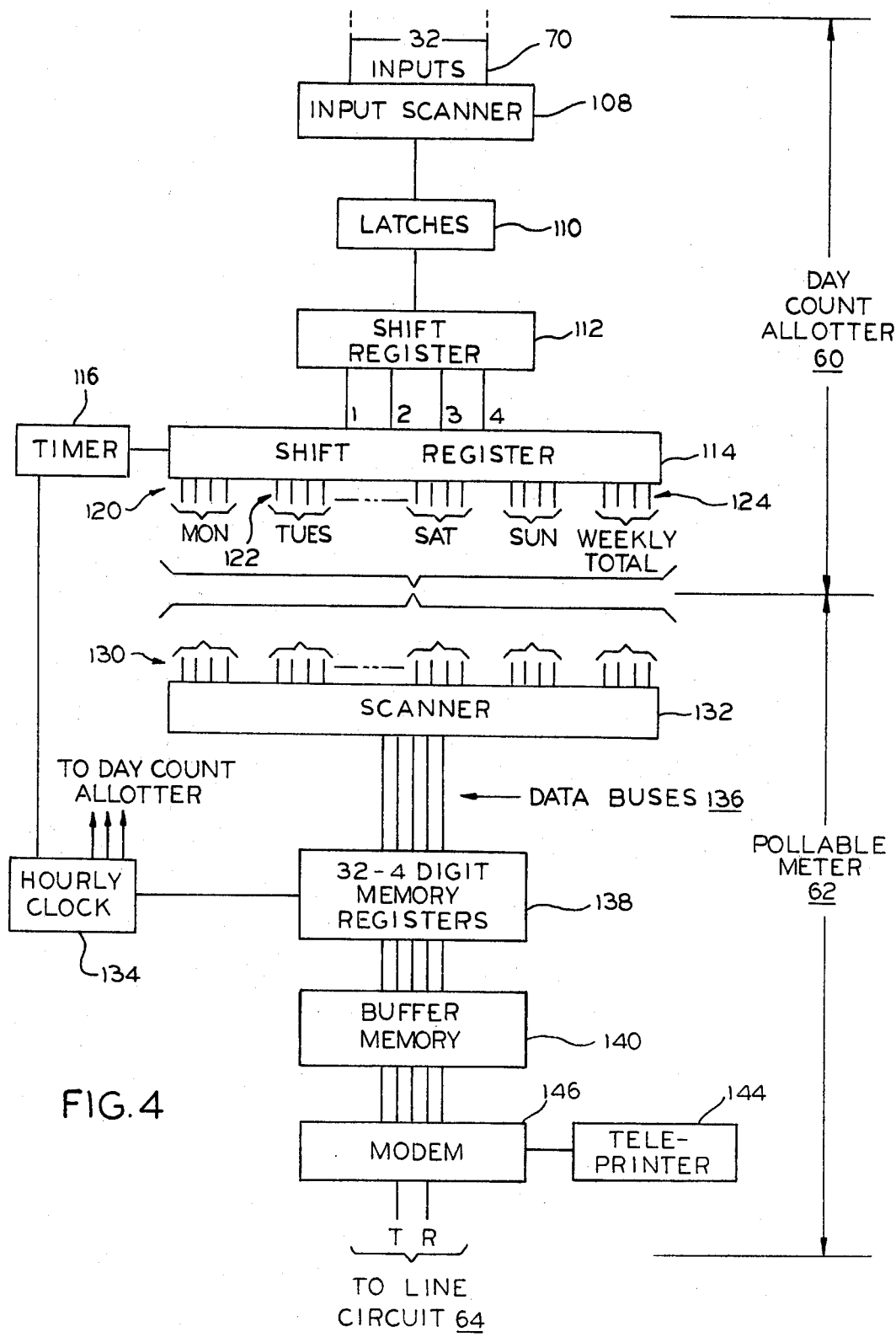
FIG. 4 is a block diagram of the inventive circuit.

FIG. 1 has been drawn to represent usage of the invention in connection with a step-by-step switching system, since the disclosure is thereby simplified. However, it must be understood that the invention is equally applicable to virtually any type of switching system regardless of whether it is electronic or electromechanical.

This step-by-step system is here shown in an extremely simplified form with calling and called subscriber lines 20, 22, respectively, connected to individually associated line circuits 24, 26. The calling line circuits 24 are connected to the banks of suitable finding or call originating switches 28. The called line circuits 26 are connected to connecting or call terminating switches 30. Of course, each subscriber line circuit is connected to both the finding and connecting circuits so that it can both originate and receive calls. In between the finding and connecting switches 28, 30, respectively, there may be any other suitable routing or switching network, symbolically shown at 32.

Each of the finders in a first group 34 is connected to the same group of subscriber lines. If any one switch in the group 34 (such as finder 36, for example) is busy, another switch (not shown) in the same group with an equivalent connection may still serve the next call. Therefore, as long as any finder remains idle in the group 34, a subscriber in that group may place a call. The connectors 30 are also connected in groups (the first of which is shown at 38) so that any call to a line served by such group may be completed, as long as any one connector remains idle in that group. The traffic problem is to be sure that there are enough finders 28 and connectors 30 so that the probability is that at least one switch is always available in each group of switches.

As is known, each access point to a switching network usually has three or four conductors associated therewith, which conventionally include tip (T), ring (R), and sleeve (S) conductors. In some systems, the sleeve lead is called a "C" wire, although no particular significance is attached to terminology. The sleeve leads are used to hold, control or supervise, and release talking paths through the switching system. For present purposes, the important bit of information is that a busy line is signified by an appearance of a "distinctive potential" upon the sleeve lead. In electromechanical systems, this distinctive potential is generally a ground potential. In electronic systems, it is often 5 or 6 volts, for example. Of course, other potential are also useful, for example, a −48 volts may be used as an idle mark. Therefore, the term "distinctive potential" is intended to cover not only these, but also every other suitable form of observable line marking.

FIG. 1 has been drawn to represent any suitable number of equivalent finder and connector groups, four of which are shown at 34, 40-42 and 38, 44-48. As is conventional, each of these switch groups is assigned to serve a different preselected number of subscriber lines. Therefore, line A is one of perhaps 100-lines which are served by, say 12-line finders, such as switch 36. Likewise, line B is one of 100-lines which are served by a suitably sized group of connectors 50.

From each connector sleeve or S lead, a connection 52 is extended to the inventive peg counter 54, which is a separate and usually portable unit that may be carried into the central office and placed near the equipment to be monitored. Thus, for example, wire 56 leads from the sleeve wiper 58 of connector 50 to peg counter 54. Anytime that connector 50 is busy, ground appears on both sleeve wiper 58 and wire 56. The sleeve 58 and wire 56 have no potential if connector 50 is idle. Therefore, the peg counter 54 is continuously informed as to the busy or idle condition of connector 50. In like manner, the busy or idle status of all connectors 30 are also continuously indicated on connections 52.

Part of the peg counter 54 is a day count allotter 60 which concentrates peg counts from up to thirty-two finder or connector groups and stores them on a daily basis, for weekly printout or polling. Accordingly, an object of the day count allotter 60 is to keep a bulk tally of the total number of times that the switches in the observed groups are taken into use and made busy, with an allocation of such tally to the individual days of the week.

The outputs of the day count allotter 60 are connected directly into a pollable meter 62, which, in turn, is connected to a line circuit 64. The line circuit 64 may be seized via the switching network 28, 32, 30, exactly as any line circuit (such as 26) is seized. Therefore, the pollable meter 62 may have its own directory number, and a central computer or other suitable device may be adapted to periodically dial such directory number to receive an automatically transmitted report of the existing peg count. Of course, the line circuit may also be called responsive to a manually dialed number.

The control panel of the day count allotter 60 is seen in FIG. 2. This allotter eliminates the need for manually reading registers, concentrates thirty-two inputs into four registers, allots four micro-counter meters per day for storing peg counts, collects counts on a daily basis throughout one week periods, and provides weekly totals of daily data.

The inputs of the day count allotter 60 may be connected to either sleeve leads or electromechanical registers, to accurately combine their peg count data. In one exemplary structure, there are thirty-two inputs which may be split into a suitable number of groups, such as four groups of eight inputs per group. If there are more than eight switches per observed group, two or more of the groups may be combined using front panel toggle switches 66. For example, if two of the switches 66 are operated, there may be two observed groups of sixteen inputs each. Or, if all of the switches 66 are operated, there may be one group of thirty-two inputs. The data received over the inputs are allotted to different meters assigned to each day of the week. If any daily meters are not so assigned, they may be used to collect single source peg count, such as all-trunks-busy conditions.

To provide pollable data transfer, the output ports of the day count allotter 60 are connected to electronic registers in the pollable meter 62 (FIG. 3). The day count allotter 60 continuously cycles through a transfer of data sequence to update the information stored in the pollable meter 62. In one exemplary system, this means that the data is transferred from the day count allotter to the pollable meter every 600 ms.

At 0000 hours on each day of the week, the day count allotter allots four of its thirty-two output ports to four registers in the pollable meter 62, to there store the combined daily peg counts from all of the day count allotter inputs. Four day count allotter output ports are continuously assigned to four registers in pollable meter 62, which collect a tally of the weekly totals of the daily registers. On the seventh day, the day count allotter may be arranged to command the pollable meter 62 to transfer the data stored in its thirty-two registers into its buffer memory and to reset to the first day.

Therefore, the system may collect peg count information for another week. The transferred data may be immediately printed out on a teleprinter or stored in the buffer memory of the pollable meter 62 in order to enable a remote polling via the telephone network at anytime during the week. Of course, the data could be held in the pollable meter for a period which is longer than a week; however, that would interfere with the transfer of new data collected by the day count allotter at the end of such week.

The day allotter 60 is adapted to be carried to or installed at a location near the equipment to be observed (here connectors 30). Wires 52 are connected between a series of up to thirty-two, for example, input terminals 70 (FIG. 4) which are on the back of the unit of FIG. 2. Switches 66 are operated to group the inputs in a desired manner. Thus, for example, if the switch 67 is moved up, groups 1 and 2 are combined to form a single group of sixteen inlets.

The push button 68 is pressed a suitable number of times to display a digit in a window 69. If a zero appears in window 69, the day count allotter accumulates data for a full week. If a "7" is set in the window 69, data is accumulated for only one day. For example, the window is here drawn to show a displaying of the digit "6", which means that the day count allotter 60 will accumulate data for one additional day. Then, it will dump its stored data and start over to accumulate data for the next full week.

Switch 72 turns on power, which may come from the central office battery. Pilot lamp 74 lights when power is on.

The control panel of the pollable meter 62 is shown in FIG. 3. This meter has sixteen registers, expandable to thirty-two, with a storage capacity of four digits per register. The pollable meter 62 accepts either electromechanical or electronic input levels, is noise proof because it has digital input filters, stores up to 9999 counts per register for thirty or sixty minutes, has a twenty-four hour clock and office identification read out, and either prints out via a teleprinter or is pollable over the telephone network. If polled, it transmits telemetry to a distant location via a suitable modem. It may be connected directly to sleeve leads to collect peg count data directly and without requiring a day count allotter 60. If so, it collects peg counts without daily allotment. This form of counting is useful in smaller, remote offices. In addition, pollable meter 62 may also store other pertinent traffic usage information, such as dial tone delay or answer time information.

The pollable meter 62 comprises a control panel 76 and a number of switches for selecting different modes of operating. The control panel 76 has four thumb wheels 80 which may be rotated to display any suitable number in an adjacent window. These thumb wheels are used to program the operation of the pollable meter. The first wheel 82 selects the mode of operation being programmed into the machine. When wheel 82 is on position "0", wheels 84 and 85 may be set to a numerical designation which identifies the pollable meter. Thereafter, this identification number is transmitted with each read out of data.

When the wheel 82 is set on position "1", a time base may be programmed into the machine by adjustment of thumb wheels 83–85. Usually, the time base is the actual time of day when the programming is done. When the thumb wheel 82 is in position "2", the "set" button 100 may be depressed to dump the data from the active to the buffer memory. In position "3", the thumb wheel 82 enables the storage to be printed out by again depressing "set" button 100.

Switch 88 selects between electronic observed equipment or electromechanical observed equipment, so that the pollable meter 62 may be adapted to monitor the signals generated by either of these types of equipments. The switch 90 may introduce an 8 second delay to enable the pollable meter to be compatible with certain slower equipment. Switch 92 selects the baud rate at which data is read out to enable the pollable meter 62 to be compatible with teleprinters which operate at different speeds. Switch 94 may be operated to select data collecting periods of either one or one-half hour. Switch 96 may be operated so that the pollable meter 62 is either in command of or slave to other equipment. The switch 98 is operated when the pollable meter 62 is used in combination with a day count allotter 60.

The set push button 100 programs the thumb wheel data into memory or initiates a dump or print cycle. Switch 102 turns on the power to the pollable meter and pilot lamp 104 shows when power is on. Both the pollable meter 62 and day count allotter 60 may be operated from the central office battery, if desired.

The circuits in the day count allotter 60 and pollable meter 62 are shown in FIG. 4. The input terminals 70 are connected to the observed sleeve leads. Each of these input leads is sampled periodically responsive to operation of a scanner 108.

A series of latch circuits 110 are connected through the scanner 108 to individually associate with each one of the input terminals 70. These latch circuits are operated if a peg count is indicated on a sleeve lead, when the scanner 108 connects an individual one of the inputs 70 to its associated latch circuit. These latch circuits are connected to four memory circuits in a shift register 112. Thus, the total number of peg counts read at all of the thirty-two inputs are concentrated to four bulk data storage devices, one per observed group.

A time controlled shift register 114 is connected to the outputs of the four memory circuits in shift register 112. At 2400 hours, or midnight each day, the timer 116 advances the shift register 114 relative to the shift register 112. Therefore, on Mondays, shift register 112 transfers its accumulated data to a section of shift register 114 adjacent outputs 120. That night, the timer 116 advances shift register 114 so that on Tuesday shift register 112 transfers its stored data to a section of shift register 114 adjacent outputs 122. This way, the data is separately recorded in register 114, and shifted out separately for every day of the week. Simultaneously, a running weekly total is continuously available at outputs 124 of the shift register 114.

The data accumulated in the day allotter 60 may be taken directly from the outputs 120–124, if there is no need to transmit it to a distant location under control of a remote device. Therefore, if desired, any suitable read out equipment may be connected to these terminals 120–124.

The outputs 120–124 of the day allotter are connected directly to corresponding inputs 130 in the pollable meter 62. A suitable scanner 132 sequentially interrogates the output terminals 120–124 to accept the data stored in shift register 114. This transfer of data is accomplished under joint control of a clock 134 and timer 116. As pointed out above, this may be a cyclical operation occurring periodically, as after each 600 ms. period, for example.

As part of the scanner 132 operation, each of the four output conductors 120–124 of the day allotter 60 is connected, in turn, over data busses 136 to memory banks 138, at a time selected by clock 134 and timer 116. Since there are thirty-two output terminals 120–124, there are thirty-two memory registers at 138, each with a four digit capacity. Therefore, after completion of the continuous data transfer process, memories 138 store the data collected by the day allotter 60, on a per day basis, plus a weekly total.

It is interesting to note that the thirty-two inputs at 70 have a different meaning than the thirty-two memories at 138. Each input at 70 represents the busy making on a sleeve lead and each memory at 138 represents one digit in data relative to a seven day accumulation for a group. Nevertheless, the pollable meter 62 does have thirty-two inputs plus thirty-two memories. Therefore, if desired, the inputs at 70 could be connected directly to the inputs at 130. With suitable changes in the read out format, the pollable meter could also deliver meaningful data, without the intervention of the day allotter. The difference is that the day allotter reads out the data in terms of the statistics of each day in the week while the pollable meter reads out bulk data.

At any appropriate time, the timer 116 and clock 134 may cooperate to cause the buffer memory 140 to accept and store the data in the memories 138. Then, at any suitable time during the week, the data may be read out of the buffer memory to teleprinter 144, at a baud rate, transmission speed selected by switch 92 (FIG. 3).

If suitable remote polling equipment dials the directory number of the pollable meter 62, the switch train of FIG. 1 seizes line circuit 64. Responsive thereto, buffer memory 140 reads out its stored data, which modem 146 transmits in a conventional manner.

Those who are skilled in the art will readily perceive various modifications which may be made in the described structure. Therefore, the appended claims are to be construed to cover all equivalent structures falling within the true scope and the spirit of the invention.

I claim:

1. A day count traffic observing and data accumulating device comprising group observing means responsive to busy signals at each of a plurality of observed equipments formed into groups for storing a memory of traffic conditions through said groups of equipment, means for concentrating the observed traffic conditions at said groups of equipment into a bulk tally, and means for distributing said tally on a daily basis, whereby said tally provides a day count allotting of traffic through all of said equipments.

2. The traffic observing device of claim 1 and means for storing a cumulative weekly total of said daily tallies.

3. The traffic observing device of claim 2 and timer means for periodically advancing said observation and for commanding a read out of said tallies.

4. The traffic observing device of claim 1 and means for grouping said observed equipments according to a predetermined plan, and means for combining said groups to accommodate groups of said observed equipments which are larger than the groupings in said predetermined plan.

5. The traffic observing device of claim 1 and pollable means connectable to be seized from an associated communication network, means for periodically transferring data relative to said bulk tally and day tally from said distributing means to said pollable means, and means responsive to seizure from said network for causing said pollable means to read out said data to said communication network.

6. The traffic observing device of claim 5 wherein said observed equipments are groups of switching means used in a telephone switching network.

7. The traffic observing device of claim 6 wherein said switching means are call originating switches or call terminating switches and said busy signals are sleeve lead markings.

8. The traffic observing device of claim 1 wherein said observed equipments are groups of switching means used in a telephone switching network.

9. The traffic observing device of claim 8 wherein said switching means are call originating switches or call terminating switches and said busy signals are sleeve lead markings.

10. A day count peg count meter for concentrating peg counts appearing at a plurality of group inputs into a bulk tally storage, means for combining said peg counts and distributing said bulk tally storage on a daily basis, and means responsive to a remotely transmitted interrogation signal for transmitting said combined stored peg counts to the interrogating equipment.

* * * * *